(12) United States Patent
Ma et al.

(10) Patent No.: US 6,490,435 B1
(45) Date of Patent: Dec. 3, 2002

(54) FLIP COVER AND ANTENNA ASSEMBLY FOR A PORTABLE PHONE

(75) Inventors: Yawei Ma, Raleigh, NC (US); Peter Karabinis, Cary, NC (US); Gerard James Hayes, Wake Forest, NC (US); James D. MacDonald, Jr., Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 1221 days.

(21) Appl. No.: 08/586,432

(22) Filed: Jan. 16, 1996

(51) Int. Cl.[7] .................................................. H04B 1/38
(52) U.S. Cl. ........................ 455/90; 455/12.1; 455/427; 455/550; 455/129; 379/433.11; 343/702
(58) Field of Search ............................ 455/89, 90, 129, 455/12.1, 347, 575, 427, 550; 379/58, 59, 429, 433, 440, 433.01, 433.11, 433.13; 343/702

(56) References Cited

U.S. PATENT DOCUMENTS

| | | | |
|---|---|---|---|
| D289,288 S | 4/1987 | Muenscher et al. .......... D14/63 |
| D298,244 S | 10/1988 | Watanabe .................... D14/64 |
| 4,816,838 A | 3/1989 | Mizuno et al. ................ 343/771 |
| 4,829,591 A | 5/1989 | Hashimoto et al. ........... 455/89 |
| 4,973,972 A | * 11/1990 | Huang ................. 343/700 MS |
| 4,980,694 A | 12/1990 | Hines ......................... 343/702 |
| D315,731 S | 3/1991 | Watanabe .................. D14/148 |
| 5,001,492 A | 3/1991 | Shapiro et al. ...... 343/700 MS |
| 5,014,346 A | 5/1991 | Phillips et al. ................. 455/89 |
| D325,029 S | 3/1992 | Nagele et al. .............. D14/138 |
| 5,170,173 A | 12/1992 | Krenz et al. ................ 343/702 |
| 5,218,370 A | 6/1993 | Blaese ........................ 343/702 |
| 5,231,407 A | 7/1993 | McGirr et al. ....... 343/700 MS |
| 5,258,892 A | 11/1993 | Stanton et al. ............... 361/814 |
| 5,337,061 A | 8/1994 | Pye et al. .................... 343/702 |
| D352,503 S | 11/1994 | Nagele ....................... D14/138 |
| D353,587 S | 12/1994 | Taylor ....................... D14/138 |
| D355,182 S | 2/1995 | Namba ....................... D14/138 |
| 5,392,054 A | 2/1995 | Bottomley et al. .......... 343/702 |
| D356,084 S | 3/1995 | Nagele et al. ............. D14/138 |
| D359,734 S | 6/1995 | Nagele et al. ............. D14/138 |
| 5,422,651 A | 6/1995 | Chang ......................... 343/749 |
| 5,436,633 A | 7/1995 | Liu .............................. 343/723 |
| 5,451,965 A | 9/1995 | Matsumoto ................. 343/702 |
| D363,069 S | 10/1995 | Bro ............................ D14/191 |
| D363,716 S | 10/1995 | Siddoway et al. .......... D14/138 |
| 5,463,406 A | 10/1995 | Vannatta et al. ............. 343/725 |
| 5,467,477 A | 11/1995 | Furuta et al. ................ 455/348 |
| 5,513,383 A | * 4/1996 | Tsao ........................... 455/575 |
| 5,535,432 A | * 7/1996 | Dent .......................... 455/12.1 |
| 5,564,076 A | 10/1996 | Auvray ......................... 455/76 |

* cited by examiner

*Primary Examiner*—Doris H. To
(74) *Attorney, Agent, or Firm*—Coats & Bennett, P.L.L.C.

(57) ABSTRACT

A flip cover and antenna assembly for a portable phone is disclosed as being rotatably coupled to a main housing thereof. The flip cover and antenna assembly includes a first flip cover housing, a second flip cover housing matable with the first flip cover housing, and an antenna element positioned between the first and second flip cover housings. The antenna element further includes a ground plane bonded to the ground plane first surface. A dielectric foam is positioned over any remaining area of the ground plane first surface. The first and second flip cover housings have flanges which extend from at least a portion thereof to wrap around corresponding edges of the main housing, which enables extensions of the ground plane to be provided conforming to the flanges. The ground plane may also be patterned in order to control the radiation pattern thereof and limit any interference from other components of the portable phone. The flip cover and antenna assembly may also include a second antenna in the form of a printed circuit antenna or a monopole antenna.

21 Claims, 2 Drawing Sheets

FLIP COVER AND ANTENNA ASSEMBLY FOR A PORTABLE PHONE

BACKGROUND OF THE INVENTION

1. Field of the Invention

The present invention relates to a portable phone and, more particularly, to a flip cover and antenna assembly coupled to a main housing of such a portable phone.

2. Description of Related Art

Portable cellular phones, which typically transmit and receive signals at a frequency of approximately 900 Megahertz, are well known and have been utilized for the last several years. Recently, however, it has become important for a second mode of communication, i.e., satellite, to be employed in areas where cellular communication is unavailable due to the lack of necessary cellular towers or stations. Such satellite communication occurs at frequencies within the L-band, and generally in the range of 1.0 to 30.0 Gigahertz.

It is recognized that separate antennas are necessary for cellular and satellite mode communication since cellular antennas are linearly polarized and satellite antennas are circularly polarized. A further difference is that the satellite communication mode involves a directional component, where link margin is increased when the satellite antenna is pointed toward the satellite, and the cellular mode communication mode does not. Thus, the positioning of the satellite antenna in the portable phone is very important, as is the construction of the satellite antenna.

Flip covers for portable phones have generally been used to protect the keypad or display and has only extended over part of the phone base. In certain applications, though, a flip cover has been utilized to house an antenna (e.g., U.S. Pat. Nos. 5,337,061, 5,258,892, 5,014,346, and 5,170,173). As will be seen herein, each of the antennas disclosed in these patents is of a different construction than the satellite antenna of the present invention. Additionally, the mechanical coupling of the flip cover to the main housing in such patents involves rotation about a single axis between an open and closed position.

It has been found that the form of antenna desired for satellite mode communication is a radiating patch element, which presents certain electrical and structural challenges when positioned within a flip cover of a portable phone. In particular, the gain for such types of antennas needs to be increased for acceptable performance, as does control over the radiation patterns thereof. The radiating patch elements must also be adequately secured within the flip cover housing to maintain stability and consistency. At the same time, the overall aesthetic impression of a portable phone including such a flip cover and antenna assembly must remain pleasing to the user.

In light of the foregoing, a primary object of the present invention is to provide a flip cover and antenna assembly for a portable phone capable of operating in satellite and/or cellular communication modes.

Another object of the present invention is to provide a flip cover and antenna assembly for a portable phone which maximizes the gain of the antenna element in such flip cover.

Yet another object of the present invention is to provide a flip cover and antenna assembly for a portable phone which maintains the overall look, feel and impression of the portable phone.

Still another object of the present invention is to provide a flip cover and antenna assembly which is compatible with rotation about two separate axes.

Another object of the present invention is to provide a flip cover and antenna assembly for a portable phone which maintains structural integrity when used in the operating environment.

These objects and other features of the present invention will become more readily apparent upon reference to the following description when taken in conjunction with the following drawing.

SUMMARY OF THE INVENTION

In accordance with the present invention, a flip cover and antenna assembly for a portable phone is disclosed as being rotatably coupled to a main housing thereof. The flip cover and antenna assembly includes a first flip cover housing, a second flip cover housing matable with the first flip cover housing, and an antenna element positioned between the first and second flip cover housings. The antenna element further includes a ground plane having a first surface and a second surface, with at least one radiating patch element bonded to the ground plane first surface. A dielectric foam is positioned over any remaining area of the ground plane first surface. The first and second flip cover housings have flanges which extend from at least a portion thereof to wrap around corresponding edges of the main housing, which enables extensions of the ground plane to be provided conforming to the flanges. The ground plane may also be patterned in order to control the radiation pattern thereof and minimize RF interaction with the portable phone and its user. The flip cover and antenna assembly may also include a second antenna in the form of a printed circuit antenna or a monopole antenna.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1:
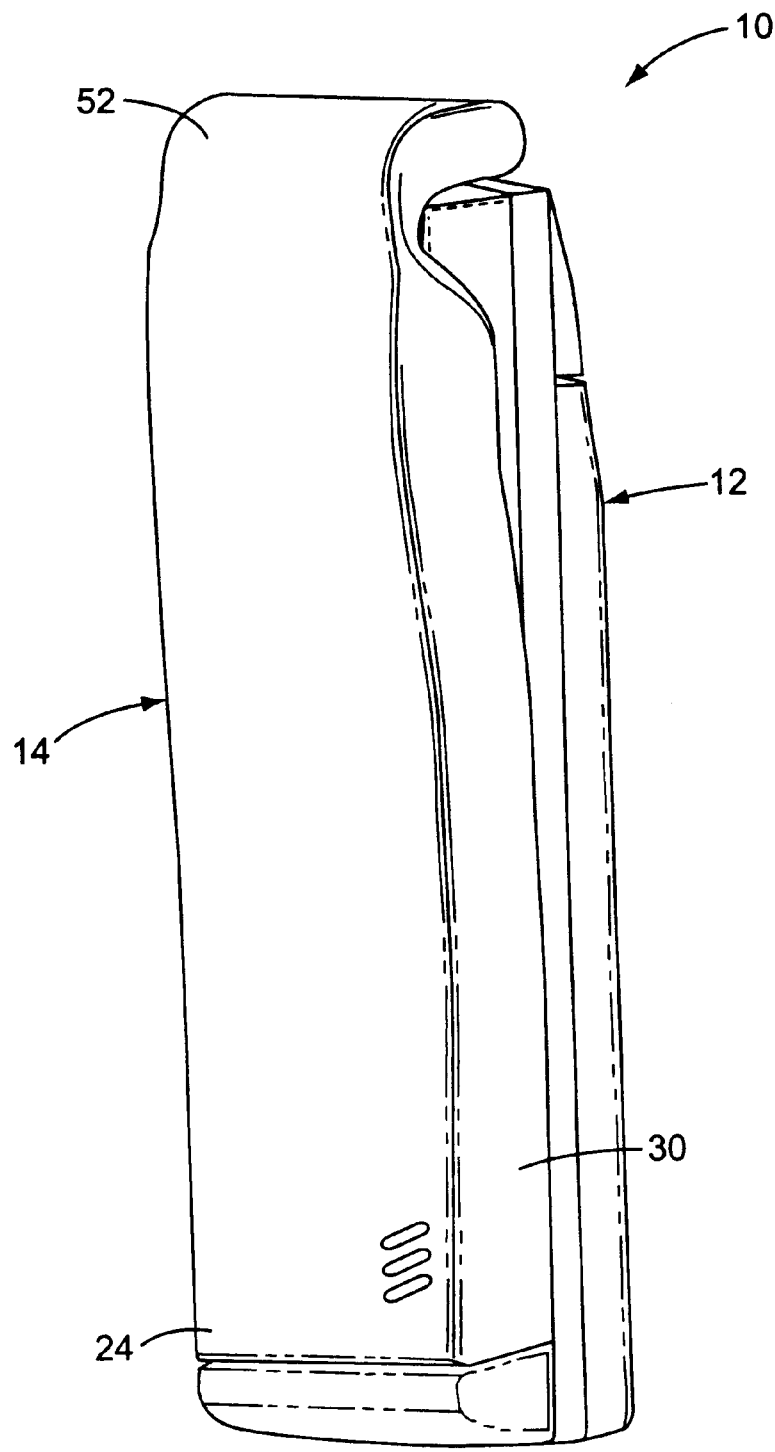
FIG. 1 is a perspective view of a portable phone having a flip cover and antenna assembly in accordance with the present invention.
Figure 2:
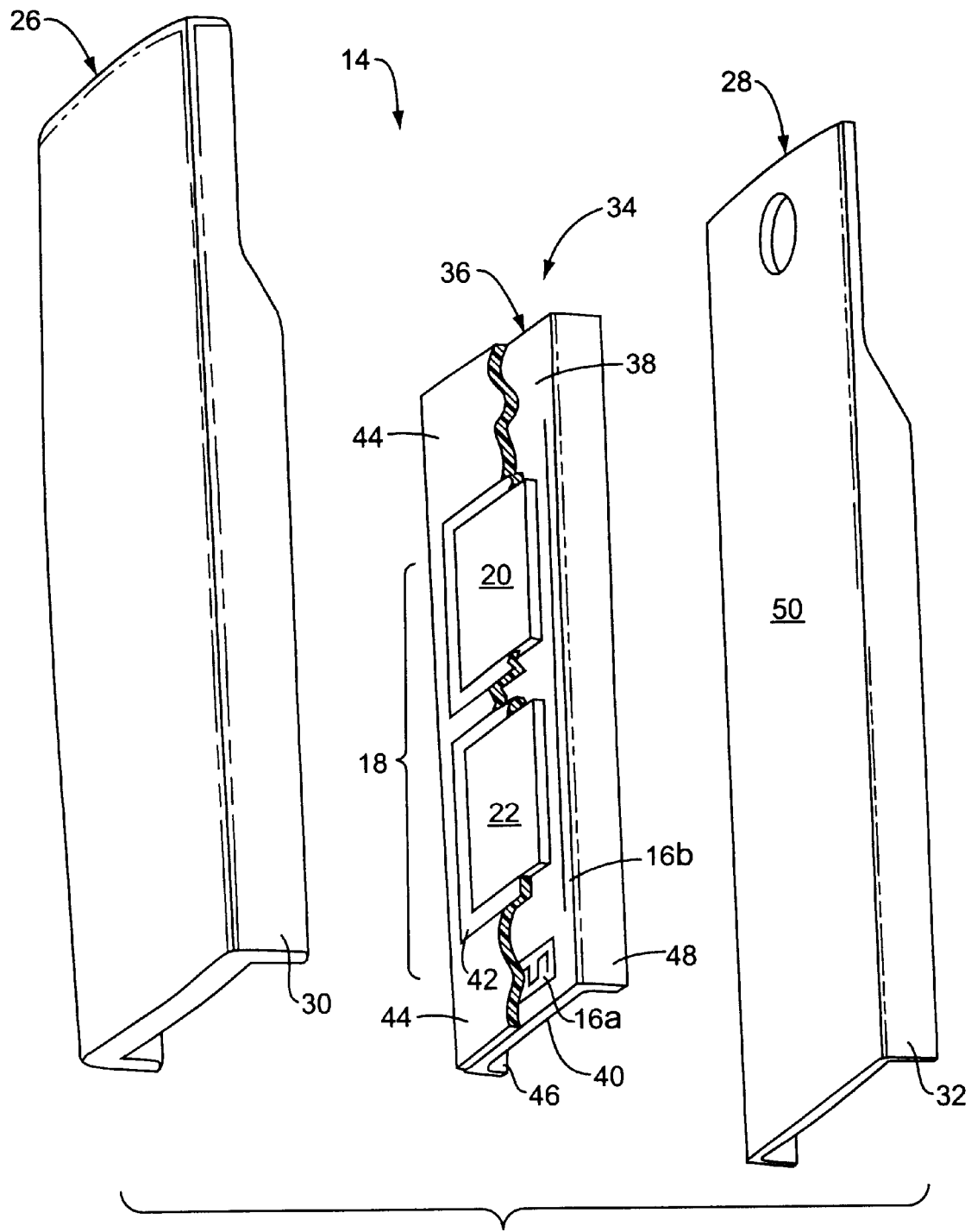
FIG. 2 is an exploded, perspective view of the flip cover and antenna assembly depicted in FIG. 1.

Referring now to the drawing in detail, wherein identical numerals indicate the same elements throughout the figures, FIGS. 1 and 2 depict a handheld portable phone capable of operating in the dual modes of cellular and satellite communication and is indicated generally by the numeral 10. It will be seen that portable phone 10 includes a main housing 12 rotatably secured to main housing 12. The coupling of flip cover 14 and main housing 12 can be accomplished directly, as shown and described in a patent application filed concurrently herewith entitled "Antenna System for Dual Mode Satellite/Cellular Portable Phone," Ser. No. 08/586-433, which is owned by the assignee of the present invention and is hereby incorporated by reference. Alternatively, coupling of flip cover 14 and main housing 12 may be done indirectly through a support bracket assembly, as shown and described in a patent application filed concurrently herewith entitled "Detachable Flip Cover Assembly for a Portable Phone," Ser. No. 08/586,197, which also is owned by the assignee of the present invention and is hereby incorporated by reference. Further, while not shown, it will be understood that main housing 12 includes circuitry therein enabling portable phone 10 to communicate in both the cellular and satellite modes of communication, such as shown and described in a patent application entitled "Dual Mode Satellite/Cellular Terminal," Ser. No. 08/501,575, which is owned by the assignee of the present invention and is hereby incorporated by reference.

Portable phone 10 includes a first antenna 16 coupled to the cellular circuitry in main housing 12 for receiving and transmitting signals in the cellular mode and a second antenna 18 coupled to the satellite circuitry in main housing 12 for receiving and transmitting signals in the satellite mode. As seen in FIG. 2, it is preferred that first antenna (which is linearly polarized) be a printed circuit antenna 16a located on an interior surface of flip cover 14. Alternatively, first antenna 30 may be a wire monopole type antenna 16b (as shown in FIG. 2) housed within flip cover 14.

As seen in FIG. 2, second antenna 18 preferably is comprised of a first patch antenna element 20 for transmitting signals to a satellite and a second patch antenna element 22 for receiving signals from a satellite, although a single patch antenna element may be utilized to perform both functions. In order to minimize interference, first and second patch antenna elements 20 and 22 are tuned to separate frequency bandwidths of operation, depending on those available. Accordingly, it is preferred that first patch antenna element 20 transmit signals within a first frequency bandwidth (e.g., approximately 1.626 to approximately 1.661 Gigahertz) and second patch antenna element 22 receive signals from a satellite within a second frequency bandwidth (e.g., approximately 1.525 to approximately 1.560 Gigahertz). It will be noted that each of the frequency bandwidths of operation for first and second patch antenna elements 20 and 22 are approximately 0.035 Gigahertz and are much higher than the normal operational frequency for the cellular mode of communication, which is approximately 900 Megahertz.

Since the satellite mode of communication involves a directional component, whereby link margin between portable phone 10 and an applicable satellite is improved when second antenna 18 is positioned in alignment therewith, an important aspect of the present invention is to provide a configuration in which second antenna 18 may be maneuvered into position without undue effort. Additionally, because the radiation to the user is to be minimized and the ratio of gain to temperature is directly related to link margin, it would be advantageous for second antenna 18 to be located away from the user of portable phone 10. By positioning first and second patch antenna elements 20 and 22 within flip cover 14, with transmitting patch antenna element 20 being located near a distal end 24 of flip cover, each of these objectives is met.

More specifically, FIG. 2 depicts flip cover 14 as including a first (or outer) flip cover housing 26 and a second (or inner) flip cover housing 28. It will be noted that flip cover housings 26 and 28 preferably each have a flange 30 and 32 extending from at least a portion of their respective perimeters of conforming relation. This enables flip cover 14 to wrap around corresponding edges of main housing 12 when in the closed position (see FIG. 1).

An antenna assembly, denoted generally by the numeral 34, includes a ground plane 36 having a first surface 38 and a second surface 40. While they could be mounted to either surface, FIG. 2 shows first and second patch antenna elements 20 and 22 positioned on first surface 38 where they will be adjacent to first flip cover housing 26 after flip cover 14 is assembled. In order to enhance performance of first and second patch antenna elements, a dielectric foam 44 is preferably applied to the remaining area of ground plane first surface 38. Dielectric foam 44 is preferably a silicone foam having good compression and set resistance in order to stiffen flip cover 14. An example of such a silicone foam is sold under the name "Poron," which is made by the materials division of Rogers Corporation located at East Woodstock, N.Y. When in the printed circuit design, first antenna 16 may also be positioned on ground plane first surface 38 or on the interior surface of first flip cover housing 26.

In order to enhance the gain of first and second patch antenna elements 20 and 22, ground plane 36 preferably includes extensions 46 and 48 which are oriented substantially perpendicular thereto. It will be understood that ground plane extensions 46 and 48 are sized to conform with flanges 30 and 32 of first and second flip cover housings 26 and 28, respectively. Further, although shown as being substantially planar, ground plane 36 may be patterned in shape and area to control the radiation patterns of first and second antennas 16 and 18, as well as to minimize interference with other components of portable phone 10.

Since first and second flip cover housings 26 and 28 are made of a plastic material (e.g., a polycarbonate polyester blend sold under the name "Xenoy" by General Electric Company's Plastics Division of Pittsfield, Mass.; a polyphenelyne oxide sold under the name "Noryl" by General Electric Company's Plastics Division of Pittsfield, Mass.; or a liquid crystal polymer sold under the name "Xydar" by Amoco Performance Products of Norcross, Ga.), second flip cover housing 28 preferably has a metalized layer 50 applied to the surface thereof adjacent ground plane 36 when flip cover 14 is assembled. This metalized layer 50 helps to improve the electrical connection to ground plane 36. In this way, flip cover housings 26 and 28 act as radomes to first and second antennas 16 and 18.

It will be noted that flip cover 14 (and correspondingly first and second flip cover housings 26 and 28) may include a slotted portion (not shown) therein at a coupling end 52 thereof. This would be provided in order to allow flip cover 14 to be rotatable about a second axis as discussed in the patent applications noted above and filed concurrently herewith. Of course, connectors are provided for first patch antenna element 20, second patch antenna element 22, and first antenna 16 so that they may couple these antennas with the circuitry in main housing 12.

Having shown and described the preferred embodiments of the invention, further adaptations of the flip cover and antenna assembly disclosed herein can be accomplished by one of ordinary skill in the art without departing from the scope of the invention.

What is claimed is:

1. A flip cover and antenna assembly for a portable phone, wherein said cover is rotatably coupled to a top portion of a main housing, said flip cover and antenna assembly comprising:

(a) a first flip cover housing;

(b) a second flip cover housing matable with said first flip cover housing; and (c) an antenna assembly positioned between said first and second flip cover housings, said antenna assembly further comprising:

(1) a ground plane having a first surface and a second surface; and (2) at least one radiating patch antenna element bonded to said ground plane first surface, said radiating patch antenna element being operable in a frequency bandwidth for satellite mode communication.

2. The flip cover and antenna assembly of claim 1, further comprising a dielectric material surrounding each of said radiating patch antenna elements.

3. The flip cover and antenna assembly of claim 2, said dielectric material comprising a dielectric foam positioned over any remaining area of said ground plane first surface.

4. The flip cover and antenna assembly of claim 1, wherein said first and second flip cover housings are constructed of a plastic material.

5. The flip cover and antenna assembly of claim 1, said second flip cover housing including a metallized layer formed thereon abutting said ground plane second surface.

6. The flip cover and antenna assembly of claim 1, wherein said first and second flip cover housings function as radomes to said radiating patch antenna element.

7. The flip cover and antenna assembly of claim 1, wherein said ground plane is patterned in shape and area to control radiation patterns of said radiating patch antenna element and to minimize RF interference with said portable phone and any user thereof.

8. The flip cover and antenna assembly of claim 1, further comprising a printed circuit antenna formed onto a surface of said flip cover for cellular mode operation.

9. The flip cover and antenna assembly of claim 1, further comprising a monopole antenna located between said first and second flip cover housings for cellular mode operation.

10. The flip cover and antenna assembly of claim 1, further comprising:
   (a) a first radiating patch antenna element for transmitting signals within a first specified frequency bandwidth; and
   (b) a second radiating patch antenna element for receiving signals within a second specified frequency bandwidth.

11. The flip cover and antenna assembly of claim 1, said radiating patch antenna elements being operable in a frequency bandwidth for satellite mode communication.

12. A flip cover and antenna assembly for a portable phone, wherein said flip cover is rotatably coupled to a top portion of a main housing, said flip cover and antenna assembly comprising:
   (a) a first flip cover housing;
   (b) a second flip cover housing matable with said first flip cover housing, wherein said first and second flip cover housings include flanges extending from at least a portion thereof to wrap around corresponding edges of said main housing; and
   (c) an antenna assembly positioned between said first and second flip cover housings, said antenna assembly further comprising;
      (1) a ground plane having a first surface and a second surface, said ground plane including extensions on each side conforming to said flanges of said first and second flip cover housings; and
      (2) at least radiating patch antenna element bonded to said ground plane first surface, said radiating patch antenna element being operable in a frequency bandwidth for satellite mode communication.

13. A portable phone, comprising:
   (a) a main housing;
   (b) circuitry located within said main housing for operating said portable phone in a satellite mode of communication;
   (c) a flip cover rotatably secured to a top portion of said main housing about a first axis, said flip cover including a first flip cover housing and a second flip over housing mated together; and
   (d) an antenna coupled to said satellite circuitry for receiving and transmitting signals in said satellite communication mode, said antenna being located between said first and second flip cover housings and further comprising:
      (1) a ground plane having a first surface and a second surface; and
      (2) at least one radiating patch antenna element bonded to said ground plane first surface.

14. The portable phone of claim 13, further comprising a dielectric foam positioned over any remaining area of said ground plane first surface.

15. The portable phone of claim 13, said first and second flip cover housings including flanges extending from at least a portion of their perimeter which wrap around corresponding edges of said main housing, said ground plane including extensions on each side conforming to said flanges on said first and second flip cover housings.

16. The portable phone of claim 13, said second flip cover housing including a metallized layer formed thereon abutting said ground plane second surface.

17. The portable phone of claim 13, wherein said ground plane is patterned in shape and area to control radiation patterns of said radiating patch antenna elements and to minimize RF interference with said portable phone and any user thereof.

18. The portable phone of claim 13, further comprising:
   (a) circuitry located within said main housing for operating said portable phone in a cellular mode of communication;
   (b) an antenna coupled to said cellular circuitry for receiving and transmitting signals in said cellular communication mode, said cellular antenna being integrated with said flip cover.

19. The portable phone of claim 18, said cellular antenna comprising a printed circuit antenna formed onto a surface of said flip cover.

20. The portable phone of claim 18, said cellular antenna comprising a monopole antenna located between said first and second flip cover housings.

21. The portable phone of claim 13, said satellite antenna further comprising:
   (a) a first radiating patch antenna element for transmitting signals within a first specified frequency bandwidth; and
   (b) a second radiating patch antenna element for receiving signals within a second specified frequency bandwidth.

* * * * *